Feb. 6, 1951     A. RAPPL ET AL     2,540,290
WINDSHIELD CLEARING SYSTEM
Filed April 24, 1948

INVENTOR
Anton Rappl &
Martin Bitzer
BY
Beau, Brooks, Buckley & Beau
ATTORNEYS

Patented Feb. 6, 1951

2,540,290

UNITED STATES PATENT OFFICE 2,540,290

WINDSHIELD CLEARING SYSTEM

Anton Rappl, Eggertsville, and Martin Bitzer, Kenmore, N. Y., assignors to Trico Products Corporation, Buffalo, N. Y.

Application April 24, 1948, Serial No. 23,106

11 Claims. (Cl. 299—58)

1

This invention relates to a washer for the windows of a motor vehicle and especially to the type in which the liquid solvent is sprayed onto the windshield for a time interval in cooperation with a mechanical wiper to maintain a clear field of vision.

In the prior commercial devices of this character a pump or other device has been used which relied upon the human factor and therefore the volume of liquid discharged varied according to the duration of the human effort. Consequently, it sometimes became necessary to repeat the spray application in order to provide ample liquid for completing the washing operation. This was not only inconvenient but it also distracted from the safe maneuvering of the vehicle.

The primary object of the present invention is to provide a washer system of this general type by which greater washing efficiency is assured. Again, the invention resides in a novel arrangement which is automatic in operation, following an initial manual starting of the system, and uniform in its volumetric delivery.

The invention further resides in a washer system which will automatically discontinue the spray delivery only after a predetermined displacement has been made.

Figure 1:
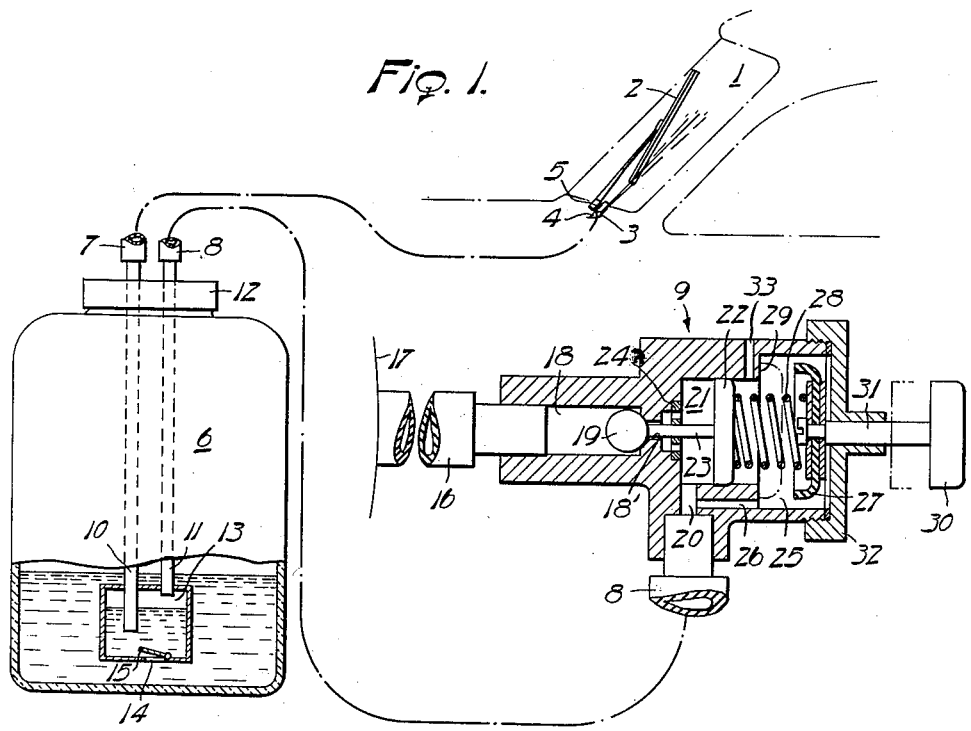
Figure 2:
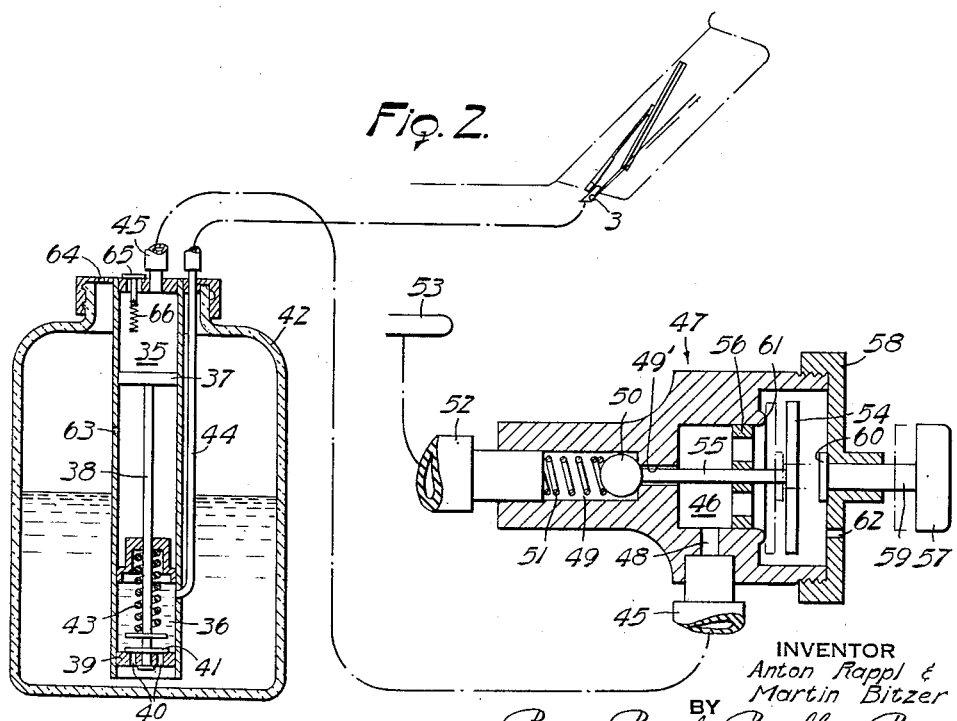

The foregoing and other objects will manifest themselves as this description progresses, reference being had to the accompanying drawing wherein:

Fig. 1 is a diagrammatic view depicting one embodiment of the present invention; and Fig. 2 is a like view of a modified embodiment thereof.

Referring more particularly to the drawing, the numeral 1 designates the windshield of a motor vehicle, 2 the oscillatory wiper therefor, and 3 the spray nozzle or jet on the cowl housing 4 in which latter the wiper shaft 5 is journaled. The jar or reservoir 6 which holds the liquid solvent may be suitably located, preferably in the engine compartment of the vehicle, and is connected by a conduit 7 to the spray nozzle 3 and by a second conduit 8 to a manual control 9 accessible to the motorist. The two conduits are connected respectively to two pipes 10 and 11 which latter are fixed in the jar cover 12 and serve to suspend a transfer chamber 13 within the jar and in the liquid content thereof. An inlet 14 admits the liquid solvent into the transfer chamber by gravity after each use of the system so that the chamber will normally contain the liquid for the next charge or spray. The gravity seated valve 15 opens to the gravity pressure of the liquid and thereafter closes to retain the charge in the chamber and to prevent

2 its return when the system is operated. The control 9 is connected by a conduit 16 to a source of superatmospheric pressure, such as the pressure tank 17.

When the control is manipulated to establish communication between the tank 17 and the transfer chamber 13 the pressure will pass down through the inlet passage 8, 11 into the chamber and force the water out through the outlet passage 7, 10. For this purpose the lower end of the outlet pipe is submerged normally in the chamber-contained liquid while the pressure pipe opens into the upper pressure chamber portion, and when the liquid is displaced to expose such lower end the air pressure will dissipate through the outlet pipe and thereby vent the system to arrest its action, in a manner now to be described.

The control as herein illustrated comprises a body casing having an inlet 18, restricted at 18' and normally closed by the pressure seated valve 19, and a relatively larger outlet 20 which opens into the conduit 8. Interposed between the inlet and the outlet is a chamber 21 in which moves a piston 22 that carries a pin 23 suitably guided by a spider 24 to unseat the valve. A counterbore chamber 25 is in communication with the outlet 20 by a passage 26 preferably of larger capacity than the restricted inlet 18', and within this chamber is a pressure retaining valve 27 which provides support for one end of a coiled spring 28 and is adapted to be moved to its seat 29 by depressing the handle 30. The stem 31 connects the valve 27 to the handle 30 and finds sliding support in the removable cover 32 of the counterbore chamber. An atmospheric vent 33 is constantly open to the space between the piston 22 and the valve 27.

In operation, the handle 30 is depressed to seat the valve 27. This increases the spring compression sufficiently to unseat the valve 19 and admit pressure into the chamber 21 as well as through passage 26 and into the counterbore chamber 25 whereupon the higher pressure will retain the valve 27 seated and enable the motorist to release the handle, this retention being assured by reason of the relatively larger surface area of the valve 27 with respect to the piston 22 and also the valve 19. With the higher pressure open to the system the charge of liquid solvent in the transfer or pressure chamber 13 will be forced out through the spray nozzle until depleted or until the lower end of the delivery passage 10 is exposed whereupon the system will vent itself through the spray nozzle to dissipate the pressure. The nozzle orifice will be of sufficient size, with respect to the restricted inlet port 18, to insure a reduction in the pressure in chamber 25 whereby to enable the spring 28 to unseat the valve 27. The spring pressure being restored to its normal degree, the valve 19 will seat under the tank pressure. These several operations successively follow the initial manual depression of the handle and having once started they will continue throughout their sequence regardless of the fact that the manual pressure on the handle has been released. This sequence of performances insures a uniform volume of spray and consequently a consistent washing of the windshield.

In the modification shown in Fig. 2 a negative pressure or subatmospheric pressure is substituted for the superatmospheric pressure of the heretofore described embodiment and consequently a pump is employed for positively displacing the liquid from the reservoir. This pump comprises a motor chamber 35 and a transfer or pump chamber 36. The motor piston 37 is connected by a rod 38 to the pump piston 39, which latter is provided with transfer ports 40 normally closed by a loosely mounted valve 41. The lower end of the tube which constitutes the casings for the two chamber portions 35 and 36 is opened and is submerged in the liquid content of the jar 42 in such a manner that following the completion of a spraying operation the liquid will flow by gravity through the transfer ports 40, unseating the valve 41 and filling the pump chamber 36 with the next charge of liquid. A spring 43 returns the pump plunger to its lowermost position. The outlet passage 44 delivers the liquid charge to the nozzle or jet 3 when suction is admitted to the pressure chamber portion 35 above the piston 37 through a passage 45. This suction passage 45 leads to a chamber 46 in the control 47 through a port 48. The suction port 49 has its restriction 49' closed by a valve 50 under the urge of a spring 51, and this suction port is connected by a conduit 52 to a suitable source of negative pressure such as the intake manifold 53 of the motor vehicle engine. A pressure retaining valve 54 carries a stem 55 which, under the guidance of a spider 56, will unseat the valve 50 to establish communication between the suction source 53 and the chamber 46, and eventually with the motor chamber 35. A handle 57 is slidably mounted in the cover 58 by its stem 59 which has an internal head 60 designed to push the pressure retaining valve 54 to its seat 61 where it is held by the pressure differential set up by reason of the atmospheric vent 62 in the cover 58.

When the handle 57 is depressed to seat the pressure or suction retaining valve 54, the valve 50 will open to establish communication between the motor chamber 35 and the source of low pressure influence whereupon the pressure differential acting on the motor piston 37, by reason of the vent 63 below the piston and the cover vent 64, will lift the pump plunger 39 to force the liquid charge out of the pressure or transfer chamber 36 and through the spray nozzle. As the motor piston approaches its upward limit of travel it will compress a spring 66 on an atmospheric valve 65 to unseat the latter and thereby dissipate the suction in the line 45 to substantially raise the pressure in the control chamber 46 sufficiently to enable the spring 51 to unseat the suction retaining valve 54 and concurrently seat the suction valve 50 for interrupting the suction communication.

In each form of the invention the sequence of steps in the system operation is carried out automatically after the manual performance of initially seating the pressure responsive member (27 or 54), and this sequence is consummated only after the complete displacement of the predetermined volume of the liquid. In both forms the fluid displacing means is operated by fluid pressure. In the embodiment of Fig. 1 the pressure enters the upper part of the chamber 13 and depresses the fluid in forcing the same out through the pipe 10; while in Fig. 2 the negative pressure enters the upper pressure chamber portion 35 to express the liquid from the liquid containing portion of the transfer chamber. In both forms of the invention the cut-off valve (19, 50) is manually unseated and there held in its open position by the pressure responsive valve (27, 54) until the pressure line system is vented to the atmosphere. The spray nozzle serves as a vent to the atmosphere in one instance while the valve 65 opens the vent in the other embodiment, for releasing the motivating pressure in order to arrest operation of the system. The windshield is supplied with a uniform quantity of the washing liquid, and a uniformity in cleaning efficiency ensues.

It is noted that the pressure beyond the cut-off valve is the pressure which actuates the holding valve (27, 54) in its operative position. As soon as this valve controlled pressure is relieved by opening the vent, either by venting through the nozzle 3 or by unseating the valve 65, the holding valve is then returned to its normally opened position and the cut-off valve again becomes operative.

The arrangement and construction is simple and satisfactory in performance, and while the foregoing description has been given in detail it is without thought of limitation since the inventive principles involved are capable of assuming other physical embodiments without departing from the spirit of the invention and the scope of the appended claims.

What is claimed is:

1. A window clearing system for motor vehicles, comprising a spray nozzle, a liquid containing reservoir connected thereto, a transfer chamber interposed between the nozzle and the reservoir and having an inlet through which liquid may flow from the reservoir into the chamber, means operable for effecting displacement of the liquid from the chamber through the nozzle, manual means for setting the first means operative, retention means acting to hold the first means operative after the release of said manual means, and means operable upon the displacement of a predetermined volume of liquid from the chamber for rendering the first means inoperative.

2. A window clearing system for motor vehicles, comprising a spray nozzle, a liquid containing reservoir, a transfer chamber having an inlet through which liquid may flow from the reservoir into the chamber, a passage connecting the nozzle to the chamber at a level below the normal level of the liquid in the chamber, a source of operating pressure, means manually operable to connect the source of pressure for effecting displacement of the liquid from the chamber through the nozzle, said means including valve mechanism for opening pressure communication and responsive to the pressure influence for retaining the open communication, and means effective upon the exposure of the passage in the chamber to dissipate the retaining pressure through the nozzle for releasing said valve mechanism to close the pressure communication.

3. A window clearing system for motor vehicles, comprising a liquid containing reservoir, a transfer chamber having an inlet through which liquid may flow from the reservoir into the chamber, a passage leading from the chamber at a level below the normal level of the liquid in the chamber, fluid pressure means for forcing the liquid from the chamber through the passage until the latter is exposed therein whereby to vent the chamber through the passage, and means responsive to such venting for rendering the fluid pressure means inoperative.

4. A windshield clearing system comprising a delivery passage, a liquid containing reservoir, a transfer chamber connected for intaking a volume of liquid from the reservoir and delivering it to the passage, fluid pressure means operable for so effecting displacement of the liquid from the reservoir to the chamber and from the chamber through the passage and including a valve normally closing communication with a pressure supply line, manual means operable to open the valve for initiating actuation of the displacing means, means responsive to the valve controlled pressure for holding the valve open upon the release of the manual means, and means operable to vent the system to the atmosphere for relieving the valve controlled pressure to render the holding means inoperative and thereby permit the valve to close.

5. A windshield clearing system comprising a delivery passage, a liquid containing reservoir, liquid displacing means including a transfer chamber connected to the reservoir by a valved port for receiving liquid therefrom, and to the passage for delivering liquid thereto, a pressure supply line connected to the displacing means for forcibly displacing liquid from the chamber, the arrangement being such that upon displacement of a predetermined volume from the chamber the pressure will be vented and dissipated to the atmosphere, a valve in the pressure line normally closing the same, manual means operable to open the valve, and pressure responsive means operable thereafter to hold the valve opened independently of the manual means and to release the valve for closing when the chamber is vented.

6. A windshield clearing system comprising a liquid holding reservoir having a delivery passage, fluid pressure actuated means for discharging a predetermined volume of the reservoir liquid through the passage and then interrupting the flow by relieving the pressure, and means responsive to the relieved pressure for interrupting the pressure communication.

7. A windshield clearing system comprising a liquid containing reservoir, liquid displacing means operable to receive a charge of liquid from the reservoir and to discharge it, a pressure supply line communicating with said displacing means and arranged to be vented to the atmosphere therethrough upon the displacement of the charge of liquid, and a normally closed control valve in the pressure supply line manually operable to open the supply line to said displacing means and retained open in response to the pressure but closable upon such venting of the pressure line.

8. A windshield clearing system comprising a liquid containing reservoir, liquid displacing means operable to receive a charge of liquid from the reservoir and to discharge it, a pressure supply line communicating with said displacing means and arranged to be vented to the atmosphere therethrough upon the displacement of the charge of liquid, a control valve arranged in the pressure supply line to normally close the same and manually operable to open the supply line to said displacing means, and means responsive to the pressure in the supply line between the valve and the displacing means for holding the valve open independently of manual effort.

9. A windshield clearing system comprising a liquid containing reservoir, liquid displacing means operable to receive a charge of liquid from the reservoir and to discharge it, a pressure supply line communicating with said displacing means and arranged to be vented to the atmosphere therethrough upon the displacement of the charge of liquid, a control valve arranged in the pressure supply line to normally close the same and manually operable to open the supply line to said displacing means, and a hold-over valve of larger area than the control valve responsive to the line pressure between the latter and the displacing means for holding the control valve inoperative until the venting of the operating pressure to the atmosphere.

10. A windshield clearing system comprising a liquid containing reservoir, liquid displacing means operable to receive a charge of liquid from the reservoir and to discharge it, a pressure supply line communicating with said displacing means and arranged to be vented to the atmosphere therethrough upon the displacement of the charge of liquid, a control valve arranged in the pressure supply line to normally close the same and manually operable to open the supply line to said displacing means, a hold-over valve of larger area than the control valve responsive to the line pressure between the latter and the displacing means for holding the control valve inoperative until the venting of the operating pressure to the atmosphere, the opening through the seat of control valve being restricted, and a spring acting on the hold-over valve for regulating the pressure in the supply line between the control valve and the displacing means.

11. A windshield clearing system according to claim 4, wherein the fluid pressure means includes a motor-pump unit in which the pump section has an intake stroke and a delivery stroke and the motor section has a piston fluid actuated on one stroke and spring-returned on the other stroke, and the venting means is rendered operative by the piston on its fluid actuated stroke to free the piston for its spring-returned stroke.

ANTON RAPPL.
MARTIN BITZER.

REFERENCES CITED

The following references are of record in the file of this patent:

UNITED STATES PATENTS

| Number | Name | Date |
| --- | --- | --- |
| 1,072,562 | Berg | Sept. 9, 1913 |
| 2,153,519 | Horton | Apr. 4, 1939 |